United States Patent
Fischer et al.

(10) Patent No.: US 8,086,325 B2
(45) Date of Patent: Dec. 27, 2011

(54) PROCESS CONTROL SYSTEM WITH A CHARGING FUNCTION

(75) Inventors: Detlef Fischer, Adelsdorf (DE); Martin Glaser, Ubstadt-Weiher (DE); Oliver Kaiser, Wörth (DE); Hans-Jürgen Sauer, Herzogenaurach (DE); Thomas Schoch, Ettlingen (DE); Rainer Speh, Weiterstadt (DE); Michael Unkelbach, Buckenhof (DE); Steffen Wagner, Stutensee (DE); Horst Walz, Straubenhardt (DE)

(73) Assignee: Siemens Aktiengesellschaft, Munich (DE)

( * ) Notice: Subject to any disclaimer, the term of this patent is extended or adjusted under 35 U.S.C. 154(b) by 916 days.

(21) Appl. No.: 10/763,786

(22) Filed: Jan. 23, 2004

(65) Prior Publication Data
US 2004/0153412 A1    Aug. 5, 2004

(30) Foreign Application Priority Data
Aug. 7, 2001 (EP) .................................... 01119041

(51) Int. Cl.
G05B 15/00 (2006.01)
G05B 13/02 (2006.01)
G05B 11/32 (2006.01)
G06F 21/00 (2006.01)
G06F 15/16 (2006.01)
G06F 3/00 (2006.01)

(52) U.S. Cl. .................. 700/1; 700/51; 700/67; 700/83; 705/51; 705/53; 705/52; 709/229; 710/11

(58) Field of Classification Search ................ 700/1, 67, 700/83; 710/11; 709/229; 705/51, 53
See application file for complete search history.

(56) References Cited

U.S. PATENT DOCUMENTS

| | | | | |
|---|---|---|---|---|
| 5,103,392 A | * | 4/1992 | Mori | 705/53 |
| 6,233,626 B1 | * | 5/2001 | Swales et al. | 710/11 |
| 6,282,454 B1 | * | 8/2001 | Papadopoulos et al. | 700/83 |
| 6,968,384 B1 | * | 11/2005 | Redding et al. | 709/229 |
| 7,035,898 B1 | * | 4/2006 | Baker | 709/203 |
| 2002/0069172 A1 | * | 6/2002 | Omshehe et al. | 705/51 |
| 2003/0144746 A1 | * | 7/2003 | Hsiung et al. | 700/28 |
| 2004/0204775 A1 | * | 10/2004 | Keyes et al. | 700/29 |

FOREIGN PATENT DOCUMENTS

| | | |
|---|---|---|
| EP | 0 116 327 A1 | 8/1984 |
| EP | 1 093 038 A2 | 4/2001 |
| GB | 2347233 A1 | 8/2000 |
| JP | 08305560 A | 11/1996 |
| JP | 11338696 A | 12/1999 |
| JP | 2000305620 A | 11/2000 |
| JP | 2001042904 A | 2/2001 |

* cited by examiner

Primary Examiner — Albert Decady
Assistant Examiner — Sunray Chang

(57) ABSTRACT

The invention relates to a process control system comprising a calculating unit enabling a charge value (W) to be determined from operations occurring in the process control system. Preferably, said process control system comprises a process control computer with a web server and a computer which is used to access the processes control computer via Internet. The charging value (W) is especially a service fee which is to be paid to an application service provider by a user of the process control system.

18 Claims, 2 Drawing Sheets

PROCESS CONTROL SYSTEM WITH A CHARGING FUNCTION

CROSS REFERENCE TO RELATED APPLICATIONS

This application is a continuation of International Application No. PCT/EP02/08352, filed Jul. 26, 2002 and claims the benefit thereof. The International Application claims the benefits of European application No. 01119041.0 filed Aug. 7, 2001, both applications are incorporated by reference herein in their entirety.

FIELD OF INVENTION

The invention relates to a process control system.

BACKGROUND OF INVENTION

Usually process control systems are developed by a manufacturer, delivered to customers, installed in a technical system to be controlled and put into operation. The process control system consists in this case of hardware and software components which each implement at least one technical control function of the process control system. The sum of these functions provides the customers with a multiplicity of operating, observation and regulation options for the technical system.

Mostly the customer pays a price for the supply and if necessary the installation of the process control system, for example an agreed purchase price as a one-off payment, which includes the use of the process control system over its lifetime with all its functions, in which case the price given does not take into account to extent to which customers actually use the functions provided and/or how often and/or for what period specific functions are used. Furthermore customers normally receive a project planning system as part of the process control system, with which they can implement new technical control functions or can modify supplied control functions, so that the process control can be adapted during its years of operation at any time to the changing requirements of the technical system. This aspect too is not taken into account in the pricing of the process control system, Customers pay a—mostly very high—purchase price and can use the supplied components of the process control system practically as they wish, without greater or lesser use of the functions of the process control system being reflected in a subsequent payment or repayment of at least a part of the purchase price.

With a known process control system the customer thus mostly pays at the time of delivery the purchase price for the process control system, which includes a proportion of the price in each case for the hardware and the software supplied. So for the customer a greater financial investment is needed, at the latest by the time of delivery, to obtain an operable process control system with all hardware and software components.

SUMMARY OF INVENTION

From this situation the object present's itself of specifying a process control system which can be adapted flexibly to the customer's requirements and which is especially designed to reduce the given initial high investment costs, especially the investment costs for the software components of the process control system and the license payments to be made for them. A further object of the invention is to specify a process control system that features an architecture that is especially suited to overcoming the stated disadvantages of the prior art.

In accordance with the invention the object is achieved by a process control system which features a processing unit which is capable of determining a payment figure from operations running in the process control system.

The invention in this case stems from the idea of determining a payment figure, for example license fees to be paid by a customer, that depend on the actual use of the process control system. This is a way of guaranteeing that the customer—apart from any fixed basic price that may have been agreed, for example for the supplied hardware components of the process control system—must in practice only pay (extra) for those functions of process control system that he is really using. When a customer accesses functions of the process control system, the corresponding operations, triggered by the access, run in the process control system, depending on the type of function that was accessed.

Thus for example the type of operation, typically calling up a graphical process diagram with current process measurement data incorporated or executing a closed-loop control function for a unit of the technical system can have an influence on determining the payment figure. Likewise the frequency with which for example the named functions are used can have an influence on the determination of the payment figure. It is conceivable for example that each access to a specific function delivers a fixed proportion of the payment figure.

Advantageously the operations include creation and/or removal of a technical function, an operating activity and execution of an automation function.

The creation and/or removal of a process control function can for example be undertaken by customers when they are project planning the process control system and for example are creating a new process control function which is to run on the process control system by means of a project planning program. Further customers can also create a new process control function by selecting one or more functions from a set of prespecified process control functions and connecting it to the new process control function by means of the project planning program. The set of prespecified process control functions can for example be held on a computer of the process control system manufacturer, connected to the Internet by means of a Web server, so that the customer can download such prefabricated process control functions over the Internet and use them for a process control system. These types of operations in the customer's process control system can also influence how the payment figure is determined.

An operator action can for example include calling a specific process image in the process control system or operating a unit in the technical system by means of the process control system or requesting error logs, status reports, message lists etc. by means of the process control system. Operator actions can further include customer access to the process control system via the Internet, provided the process control system is capable of being operated over the Internet. In addition operator actions can also include executions of control algorithms, that are executed in a Programmable Logic Control (PLC) of the process control system for example, to keep the speed of a motor of the technical system constant during operation for example, even if the operating conditions, such as the load to be managed by the motor, change. Advantageously the process control system includes a process control computer, a client computer and the Internet, and at least a part of the operations running in the process control system run on the process control computer.

The process control system can further include one or more field devices which are advantageously installed in the technical system and are used for automation of the system components.

In this embodiment of the invention the process control system is capable of being operated via the Internet, in which case the process control computer features at least a part of the functions of the process control system which run as corresponding operations on the process control computer. If the process control system includes one or more field devices, these can also feature a part of the functions of the process control system which run as the appropriate operations on the field device or devices.

The client computer can for example be installed at almost any location with Internet access, for example in a maintenance center, which under some circumstances is very far from the technical system to be controlled. The client computer is connected to the Internet and can operate the process control computer via the Internet and thereby operate functions of the process control system, especially those that relate to the operation of the technical system. With the process control system in accordance with the invention those operating activities of the process control system for determining the payment figure can now also be incorporated which is undertaken by a user over the Internet. It is conceivable for example for the process control computer to be installed in a server farm of an Application Service Provider belonging to the latter. The service provider makes available to the user via the Internet the process control system functions installed on the process control computer. The payment figure can now be calculated depending on the operations running on the process control computer, since the operations are initiated by a user operating activity over the Internet. In the case previously mentioned, where the process control computer does not become the property of the customer, but remains with the service provider, the customer's investments in his process control system are particularly small since he must only pay in accordance with the payment figure for the use of the functions that are installed on the process control computer.

In a further advantageous embodiment of the invention the process control computer includes a Web server and the client computer an Internet browser, so that the operations running on the process control computer can be influenced by means of the client computer over the Internet, in which case the operations also include those by which further operations can be initiated in further components of the process control system.

This embodiment of the invention employs globally-available, universally-applicable Internet technologies to give the process control system Internet capabilities.

The process control computer has a Web server, which can transfer over the Internet data processed and/or stored in the process control computer. The client computer can use the Internet browser to dial up the Web server of the process control computer over the Internet and use familiar Internet technologies (for example URL addressing or TCP/IP transmission protocol) to explicitly call up data from the process control computer and/or transfer commands to the latter.

In this embodiment of the invention the process control system includes further components in which further operations run. These further components can for example be PLCs installed close to a unit of the technical system to be controlled and which receive from the process control computer a command to process a program stored in the PLC. To this extent operations which run in the process control computer initiate further operations in one or more further components of the process control computer, for example the execution of a program in a PLC, for example by an operator activity of a user who enters a command in the client computer that is transferred over the Internet to the process control computer and which causes the process control computer to initiate the execution of a program in the PLC.

In a further advantageous embodiment of the invention the components include field devices for monitoring and controlling components of a technical system that are connected by means of radio communications and/or by means of a fixed link to the process control computer and the further operations also include such operations as are executed in the field devices.

Field devices in this embodiment include at least setting and measuring devices that are installed in a technical system and by means of which settings can be made to units in the technical system or measured values of components and/or units of the technical system can be recorded. In this case the commands to initiate at last one setting intervention are transmitted by radio from the process control computer to at least one setting unit and the measured values recorded by the measurement units are transferred by radio to the process control computer. If the setting or measurement units involve devices that are not assigned to any controller, by which, for example a radio connection can be established by a radio interface card installed in one of the controllers, at least one radio device is to be provided to which the setting and/or measurement devices are to be connected so that the data that arises can be transmitted by radio.

The field devices also include what are known as "intelligent" field devices which have at least one microprocessor, so that the further operations, for example the execution of a control program, can be executed in the field devices. The field devices in such cases are more or less powerful computers in their own right that can normally easily be made capable, for example by means of a radio interface card, of communicating over a radio link with the process control computer. In these cases practically only those intelligent field devices which transmit setting commands to the setting units and read in measured values from the measurement units need to be installed in or near the location of the technical system. The field devices which perform the further operations are activated by means of the radio connection to the process control computer. The process control computer can thus be installed at almost any location with a radio connection and the client computer can be installed at almost any location with Internet access. In this way the process control system is particularly flexible with regard to the installation sites of the components of the process control system; Practically the entire functionality of the process control system can be realized in the process control computer, whereby however a part of the functionality can also be realized in the field devices and the client computer need only have an access to the Internet by means of a (widely-used) Internet browser. The client computer needs to have practically no specific process control system software and is therefore particularly cheap.

Furthermore the configuration of the process control system in accordance with this embodiment offers the advantage that diagnostics and/or maintenance and/or repair of the process control system is made possible at least partly over the Internet. Especially advantageously communication between the components of the process control system is based on the TCP/IP transmission protocol.

The most important components of the process control system are in this case the process control computer, the client computer and the field devices.

The use of said transmission protocol, which is widely used in the Internet area, makes the development and/or the use of a specific transmission protocol and/or the use of a particular medium for communication, for example a bus system consisting of optical fibers, superfluous. Furthermore, using said transmission protocol makes it possible to exploit the known Internet technologies for data transmission and program execution.

Advantageously the payment figure is a service fee to be paid by the user of the process control system to an Application Service Provider.

With this embodiment of the invention a service provider (Application Service Provider) makes available the functionality of the process control system, preferably in the process control computer, and a user, for example a customer wishing to use the process control system, uses the process control system, in which case the payment figure determined as a service charge is to be paid by the user mostly in the form of money to the service provider.

The user essentially pays only for those functions that he actually uses. He pays only for the time and/or period, at or during which he uses the functions.

To implement this type of user-dependent, dynamic determination of the payment figure, a license server application is preferably to be provided in the process control computer which has access to project planning data and to current operating data arising and/or stored archive data of the technical system.

Advantageously the customer can be equipped with a specific software program which on the one hand allows him to execute particular functions but on the other hand also obliges him to pay the corresponding "dynamic" usage-dependent payment figure that arises. Two exemplary embodiments of the invention are illustrated in more detail below.

BRIEF DESCRIPTION OF THE DRAWINGS

The diagrams show.

DETAILED DESCRIPTION OF INVENTION

Figure 1:
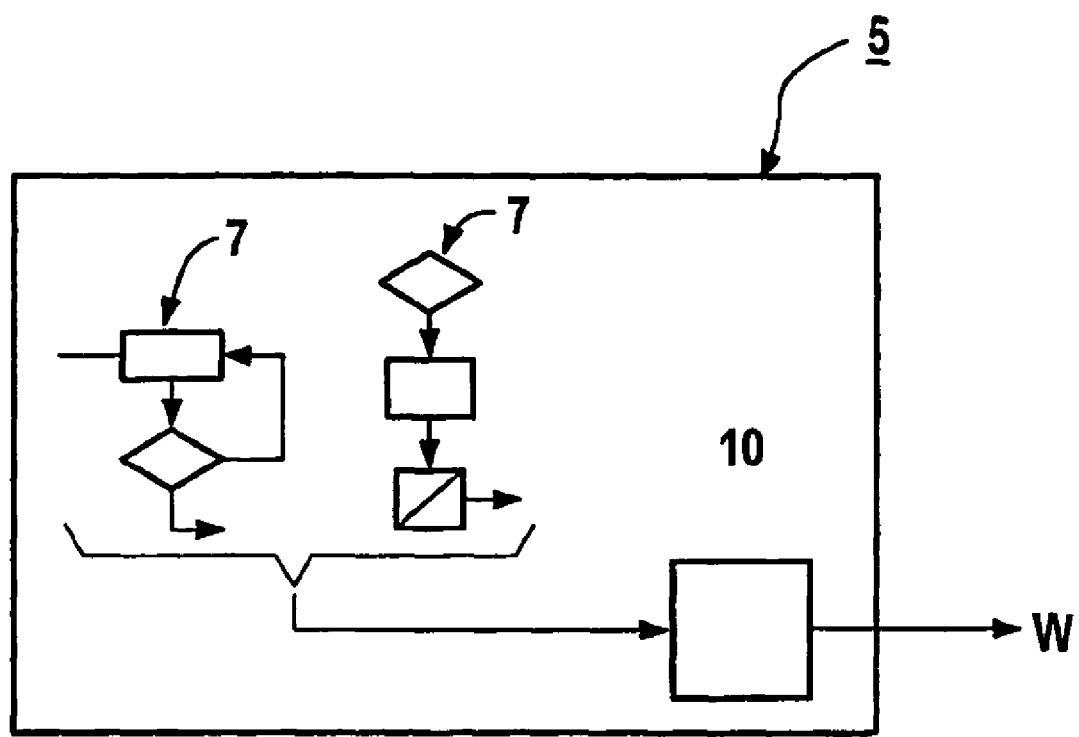
FIG. 1 a process control system in accordance with the invention, and
FIG. 2 a process control system in accordance with the invention that can be operated over the Internet.

FIG. 1 shows a process control system 5 that features a processing unit 10.

Processing unit 10 determines from the operations 7 executed in the process control system a payment figure W.

The operations 7 can for example be operations which are executed after being initiated by an operating activity of process control system 5. An example of this is the selection of for example a graphical process image of the technical system into which current measured values of the technical system and operator boxes for operating the units of the technical system are incorporated. The activation of the operator boxes, for example by means of a mouse click by a user, or a key press on the keyboard to execute a function, are also included in the operations 7. Furthermore the operations 7 include control programs running in the process control system, for example one or more automation functions, that are for example implemented as a control algorithm. A further example: for operations 7 are activities undertaken by a user for project planning of the process control system 5, in which case for example new control functions are created and/or new control functions are assembled from prefabricated base functions that advantageously are kept in a set of basic functions, by for example interfaces of such basic functions being combined and the basic functions combined in this way forming a new function.

Figure 2:
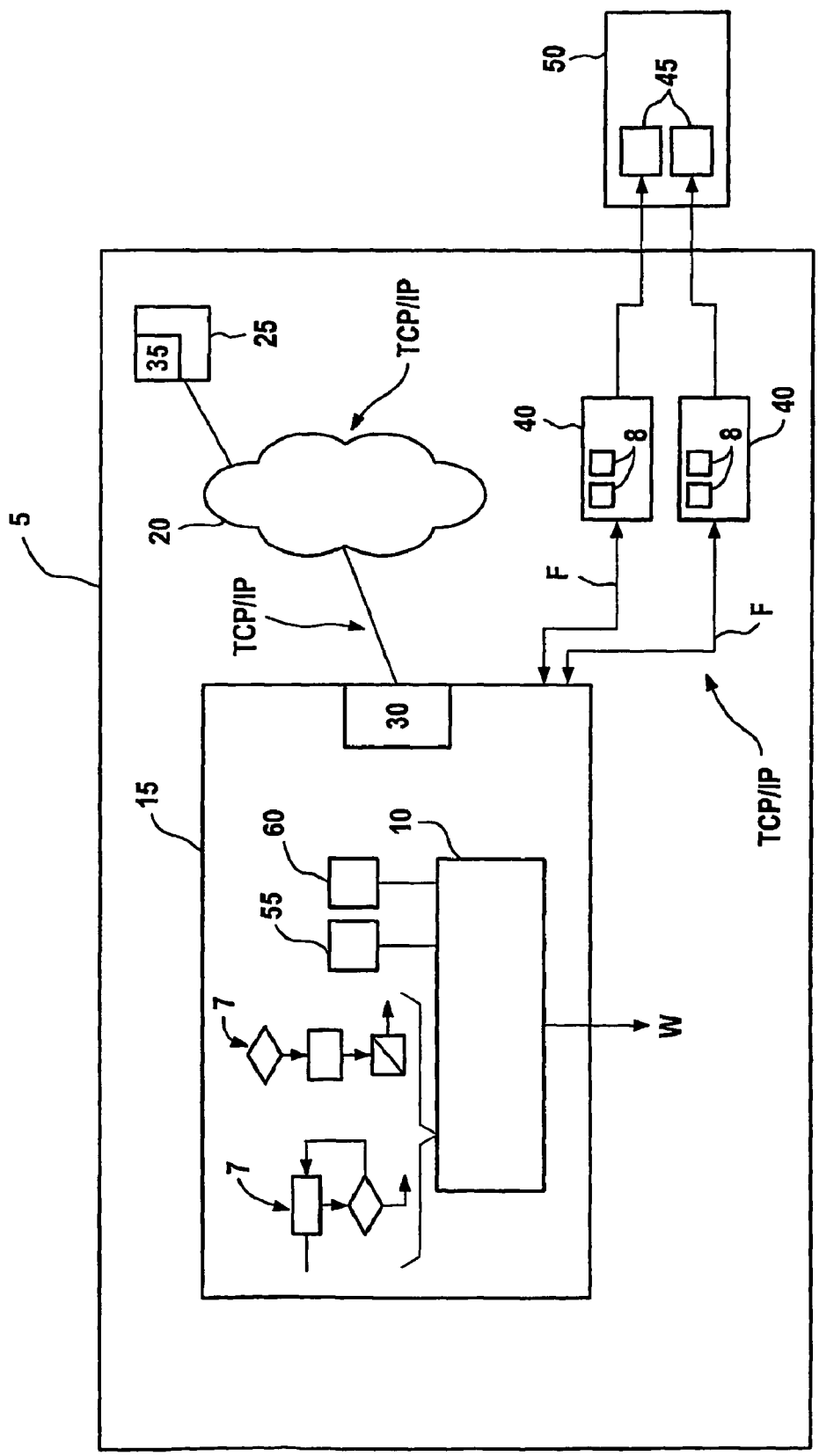

FIG. 2 shows a process control system 5 that includes a process control computer 15, a client computer 25 and the Internet 20, so that the process control system 5 can be operated by means of the Internet 20.

The process control computer includes a Web server 30, by means of which in particular the data produced in this computer which relates to the operation of a technical system 50, can be transmitted over the Internet 20. Operations 7 run in the process control computer 15, such as those already shown in conjunction with FIG. 1 for example.

The process control computer 15 further contains a processor unit 10 which determines a payment figure W from the operations 7 and/or project planning data 55 and/or operating data 60.

The project planning data 55 includes all data connected with the establishment of the process control system 5, especially in a software context. This is for example the type and number of control, regulation, operating and observation functions realized in process control system 5. From the project planning data 50 it can consequently be seen how the software system of the process control system 5 is constructed. The operating data 60 include at least current values of operating parameters, measured values and status parameters which currently predominate in the technical system 50 and which are transferred to the process control computer 15. The operating data 60 can also include the stored archive data of the signals previously mentioned, from which a past operating state of the technical system 50 can be determined.

The client computer 25 includes an Internet browser 35, by means of which it is possible to dial into the Web-Server 30 of the process control computer 15 via the Internet 20 so that the process control computer 15 of the process control system 5 can be operated over the Internet 20 Communication between the client computer and the Internet 20 and between the Internet and the process control computer 15 is preferably based on the TCP/IP-transmission protocol which is known from Internet technology and is widely used there.

The process control computer 15 is further connected via a radio link F with further components 40 of the process control system 5. These further components 40 are for example designed as field devices with their own microprocessor so that further operations 8, e.g. execution of a control program or another automation functions is made possible on the further component 40.

In their turn, the further components 40 control and/or regulate components 45 of the technical system 50.

The architecture of this embodiment of the invention allows the process control computer 15 to be operated by means of the client-computer 25 over the Internet 20 and thereby operations 7 in the process control computer 15 to be run. Running of operations 7 can initiate running of further operations 8 in the further components 40 of the process control system, if for example a user uses the client computer 25 to transfer via the Internet 20 to the process control computer 15 a control command relating to the technical system, where as a result operations 7 are executed which by means of the radio link F cause further operations 8 to be executed in the further components 40.

In this case the operations 7 can for example be execution of an identification routine that identifies the control command entered by the user and, after identification is completed, runs a control algorithm as a further operation 8 in a further component, for example in a field device, by means of which a component 45, for example, a unit of the technical system, a motor or a pump is regulated.

The payment figure W calculated by the processor unit 10 can for example be a service and/or license fee that is to be paid by the user of the process control system 5 to an Application Service Provider.

The invention claimed is:

1. A process control system for operating a technical system, comprising:
    software components licensed to a user on a fee basis which components implement technical control functions and provide the user with operating, observation and regulation options for the technical system;
    a processor unit that has access to project planning data and current operating data of the technical system and bases a payment figure on operations running in the process control system, project planning data and operating data, the operations including creation of a process control function, the payment figure to be charged to the user based on creation of the process control function.

2. The process control system according to claim 1, further comprising:
    a process control computer including an Internet connection; and
    a client computer connected to the process control computer via the Internet connection, wherein at least a part of the operations run on the process control computer.

3. The process control system according to claim 2, further comprising:
    at least one field device for automation of at least one system component, wherein at least a part of the operations run on the field device.

4. The process control system according to claim 2, wherein the process control computer comprises a Web server and the client computer comprises an Internet browser so that the client computer influences the operations running in the process control computer via the Internet, wherein the operations initiate further operations in a component of the process control system.

5. The process control system according to claim 4, wherein the component comprises a field device for monitoring and control of a further component of a technical system that is connected by radio communication to the process control computer.

6. The process control system according to claim 1, wherein the payment figure is a service fee to be paid by the user of the process control system to an Application Service Provider.

7. The process control system according to claim 1, wherein the creation of the process control function is undertaken by the user.

8. The process control system according to claim 7, further comprising a plurality of pre-specified functions, wherein the user selects at least one of the plurality of pre-specified functions in order to create the process control function.

9. The process control system according to claim 8, wherein the user downloads at least one of the plurality of pre-specified functions in order to create the process control function.

10. The process control system according to claim 1, wherein the operations include removal of the created process control function.

11. The process control system according to claim 10, wherein the operations include execution of an automation function.

12. The process control system according to claim 1, wherein the operations include execution of an automation function.

13. A method for determining a payment figure in a process control system, comprising:
    making available, via a license from a service provider to a user on a fee basis, software components which implement technical control functions and provide the user with operating, observation and regulation options for the technical system;
    recording the creation of a process control function by a processing unit; and
    determining a payment figure to be charged to the user based on the creation of the process control function.

14. The method according to claim 13, wherein the creation of the process control function is undertaken by the user.

15. The method according to claim 14, further comprising providing a plurality of pre-specified functions, wherein the user selects at least one of the plurality of pre-specified functions which is used in the creation of the process control function.

16. The process control system according to claim 13, wherein the payment figure is further based on a removal of the created process control function.

17. The process control system according to claim 16, wherein the payment figure is further based on an execution of an automation function.

18. The process control system according to claim 13, wherein the operations further regarding an execution of an automation function.

* * * * *